April 7, 1925.
L. H. MacDONALD
MOTOR VEHICLE FENDER GUARD
Filed Aug. 14, 1924
1,532,508
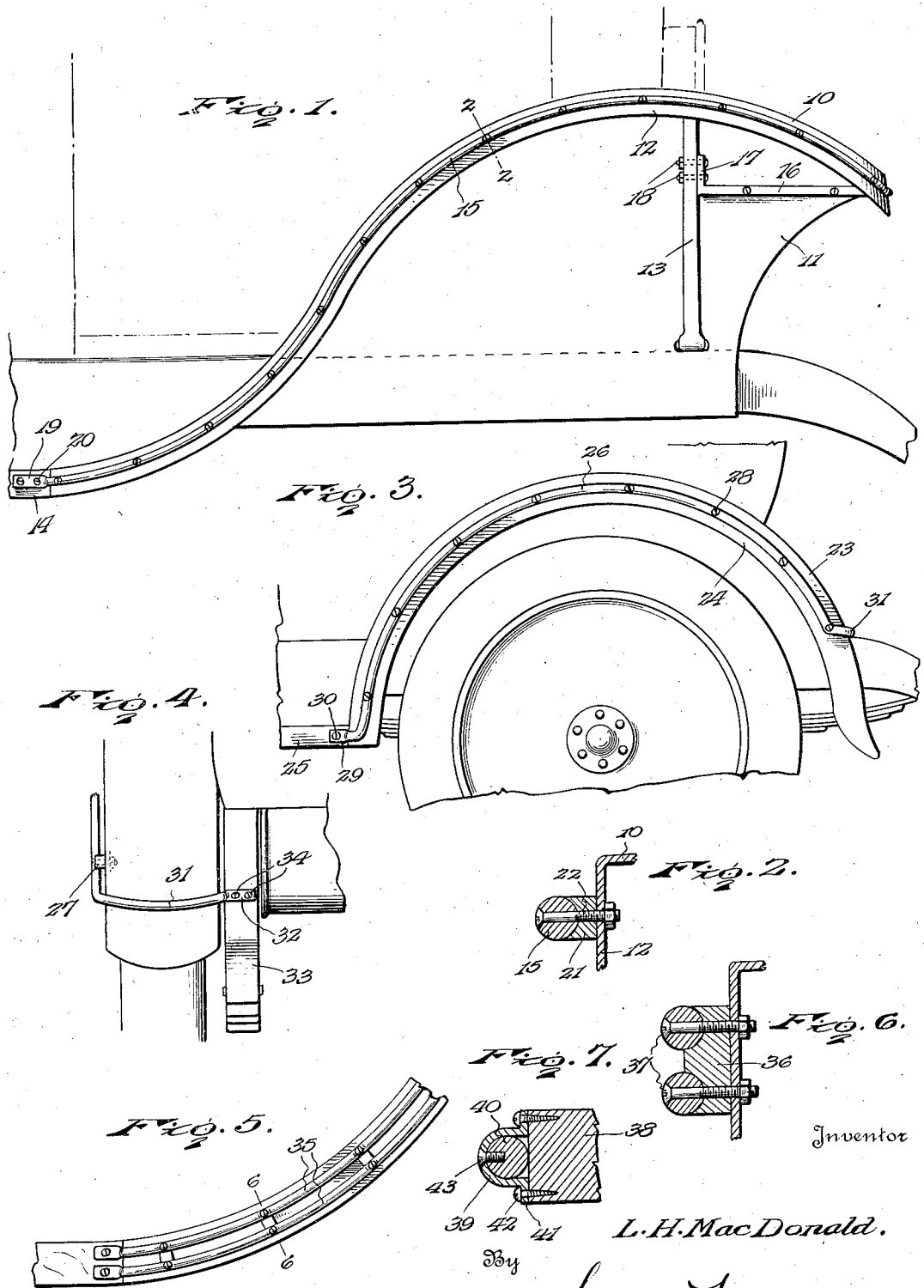
Inventor
L. H. MacDonald.
By Lacey & Lacey, Attorneys Patented Apr. 7, 1925.

1,532,508

UNITED STATES PATENT OFFICE.

LIONEL HALLECK MacDONALD, OF KANSAS CITY, MISSOURI.

MOTOR-VEHICLE FENDER GUARD.

Application filed August 14, 1924. Serial No. 732,091.

*To all whom it may concern:*

Be it known that I, LIONEL HALLECK MAC-DONALD, a citizen of the United States, residing at Kansas City, % Densmore Hotel, in the county of Jackson and State of Missouri, have invented certain new and useful Improvements in Motor-Vehicle Fender Guards, of which the following is a specification.

This invention relates to a guard for the fenders of motor vehicles and seeks to provide a device of this character which will not only protect a fender against accidental injury but will also serve to brace the fender.

The invention further seeks to provide a guard which may be readily applied to fenders of conventional design without the necessity for structural change therein.

And the invention still further seeks to provide a guard which will be ornamental as well as useful.

Other and incidental objects will appear hereinafter.

In the drawings:

Figure 1 is a side elevation showing a front fender guard constructed in accordance with the present invention.

Figure 2 is a detail sectional view on the line 2—2 of Figure 1.

Figure 3 is a side elevation showing a rear fender guard construced in accordance with the present invention.

Figure 4 is a detail rear elevation of the guard of Figure 3.

Figure 5 is a fragmentary elevation showing a double rail guard.

Figure 6 is a detail sectional view on the line 6—6 of Figure 5, and

Figure 7 is a detail sectional view particularly showing an anchoring plate which may be employed in connection with the guard.

Referring now more particularly to Figures 1 and 2 of the drawing, I have illustrated a front fender guard constructed in accordance with the present invention, the guard being shown applied to a conventional front fender of a motor vehicle. The fender is indicated at 10, the fender apron at 11, and the usual side flange of the fender at 12. Supporting the forward end of the fender is the customary fender bracket 13 while at its rear end the fender is secured to the adjacent end of one of the running boards 14 of the vehicle.

In carrying the invention into effect, I employ a preferably cylindrical guard rail 15 which is bent longitudinally to conform to the contour of the fender 10 overlying the flange 12 thereof. The rail is of steel or other approved material and, at its forward end portion, is arranged to extend around the forward end of the fender and is provided with a rearwardly directed arm 16 extending beneath the fender apron 11. Formed on said arm is a laterally directed attaching lug 17 abutting the bracket 13 and extending through said lug and through the bracket are bolts or other suitable fastening devices 18 rigidly anchoring the rail at its forward end. At its rear end the rail is flattened to define an attaching lug 19 overlying the outer edge of the running board 14 and extending through said lug are screws or other suitable fastenings 20 sunk into the running board and rigidly anchoring the rail at its rear end. Interposed between the rail and the flange 12 of the fender is a plurality of saddle blocks 21 arranged at suitably spaced points longitudinally of the rail. As shown in Figure 2, these blocks are of a width corresponding to the diameter of the rail and are provided with flat inner end faces to seat flat against the flange 12 of the fender while at their outer ends the blocks are recessed to receive the rail resting flat against the blocks. A solid mounting for the rail is thus provided and extending through the rail, said blocks, and the flange 12 of the fender are screw bolts 22 rigidly connecting the rail and the blocks with the fender, the heads of said bolts being countersunk in the rail. Thus, as will be seen, the rail will serve to protect the fender against accidental injury such, for instance, as might be brought about through a collision or the like. Furthermore, since the rail is secured at its ends to the running board and fender bracket, the rail will also serve to materially brace and reinforce the fender.

In Figures 3 and 4 of the drawings, I have shown a rear fender guard and, for convenience, have illustrated the guard applied to a rear fender 23 of a conventional motor vehicle. The side flange of the fender is indicated at 24 and, as usual, the fender is connected at its forward end to one of the running boards 25 of the vehicle. As illustrated, I employ a guard rail 26 which is similar to the rail 15 but is bent longitudinally to conform to the contour of the fender 23 overlying the flange 24 thereof. Saddle blocks 27, like the blocks 21, are employed for mounting the rail and extending through the rail, said blocks, and the flange 24, are fastening devices 28 like the fastening devices 22 so that the rail is thus rigidly secured to said flange. At its forward end, the rail is flattened to form an attaching lug 29 overlying the outer edge of the running board 25 and extending through said lug is an anchoring screw 30 sunk into the running board. At its rear end portion the rail is, as shown in Figure 4, bent to form a laterally directed arm 31 extending across the rear end portion of the fender and is flattened to provide an attaching lug 32 overlying the adjacent frame bar 33 of the vehicle. Extending through said lug are bolts or other suitable fastenings 34 securing the rail to said bar. Thus, the guard rail will not only serve to protect the rear fender but will also brace and reinforce the fender.

In Figures 5 and 6 of the drawings, I have shown a double rail guard embodying equi-distantly spaced rails 35. If employed upon a front fender, both of the rails will be substantially like the rail 15 whereas if employed upon a rear fender, both of the rails will be substantially like the rail 26. As illustrated, the rails are arranged to overlie the side flange of the fender and in conjunction therewith I provide, as shown in Figure 6, a plurality of saddle blocks 36 having spaced seats to accommodate the rails 35, instead of a single seat as illustrated in conjunction with the blocks 21. Extending through the rails, the blocks 36 and the side flange of the fender, are fastening devices 37 connecting the parts with the fender.

In Figure 7, I have shown an anchoring plate which may be employed for securing the guard rail or rails, as the case may be, to a running board of a vehicle, a running board being conventionally illustrated at 38. The plate is indicated at 39 and a guard rail at 40. The plate is provided to avoid the necessity of flattening the rail to form an attaching lug like the lug 19 and, as shown, is shaped to fit over the rail at its adjacent end. Formed on the plate are side flanges 41 accommodating anchoring screws 42 sunk into the running board and extending through the plate is an anchoring screw 43 screwed into the rail connecting the rail with the plate. Thus, the plate will serve to securely anchor the rail at its adjacent end.

Having thus described the invention, what I claim is:

1. In a motor vehicle, a wheel fender having a side flange, a guard rail overlying said flange and anchored at its ends to parts of the vehicle adjacent said fender for bracing and reinforcing the fender, saddle blocks interposed between the rail and said flange seating the rail, and fastening devices extending through the rail and said blocks connecting the rail and said blocks with said flange.

2. In a motor vehicle, a wheel fender having a side flange, a guard rail overlying said flange and conforming to the outline of the fender, saddle blocks spacing the rail with respect to said flange, and fastening devices extending through the rail and said blocks connecting the rail and blocks with said flange.

3. In a motor vehicle, a running board, a wheel fender secured thereto and having a side flange, a bracket supporting the fender, a guard rail overlying said flange conforming to the contour of the fender, saddle blocks seating the rail and spacing said rail with respect to said flange, fastening devices extending through the rail, said blocks and the flange connecting the rail and blocks with the flange, means securing the rear end of the rail to the running board, the forward end portion of the rail extending around the forward end of the fender therebeneath to confront said bracket, and means securing the forward end of the rail to said bracket.

4. In a motor vehicle, a wheel fender, saddle blocks mounted at spaced points along the outer edge of the fender, and a guard rail seated by said blocks and anchored at its ends to parts of the vehicle adjacent said fender for bracing and reinforcing the fender independently.

5. In a motor vehicle, a wheel fender, and an individual guard rail for said fender substantially conforming to the contour of the fender and secured to the outer edge thereof as well as to parts of the vehicle adjacent the fender for bracing and reinforcing the fender independently.

6. In a motor vehicle, a running board, a wheel fender secured thereto, an individual guard rail for the fender secured at one end to the running board and at its opposite end to a part of the vehicle adjacent the fender, and means connecting the rail with said fender whereby the rail will independently brace and reinforce the fender throughout its length.

7. In a motor vehicle, a running board, a wheel fender secured thereto, a bracket supporting the fender, a guard rail substantially conforming to the outline of the fender and secured at one end to the running board and at its opposite end to said bracket, and saddle blocks interposed between the rail and fender spacing the rail with respect to the fender, the rail independently bracing and reinforcing the fender substantially throughout its length.

In testimony whereof I affix my signature.

LIONEL HALLECK MacDONALD. [L. S.]